(12) United States Patent
Imazato et al.

(10) Patent No.: US 10,035,336 B2
(45) Date of Patent: Jul. 31, 2018

(54) MULTILAYER BODY

(71) Applicant: TEIJIN LIMITED, Osaka (JP)

(72) Inventors: Kenta Imazato, Osaka (JP); Katsuhiro Yamanaka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 157 days.

(21) Appl. No.: 15/103,978

(22) PCT Filed: Jan. 29, 2015

(86) PCT No.: PCT/JP2015/052436
§ 371 (c)(1),
(2) Date: Jun. 13, 2016

(87) PCT Pub. No.: WO2015/119026
PCT Pub. Date: Aug. 13, 2015

(65) Prior Publication Data
US 2017/0203556 A1 Jul. 20, 2017

(30) Foreign Application Priority Data
Feb. 10, 2014 (JP) .................................. 2014-023376

(51) Int. Cl.
C08G 63/02 (2006.01)
B32B 27/36 (2006.01)
B32B 27/08 (2006.01)
C08G 64/02 (2006.01)

(52) U.S. Cl.
CPC ............ B32B 27/365 (2013.01); B32B 27/08 (2013.01); C08G 64/0208 (2013.01); B32B 2250/244 (2013.01); B32B 2307/306 (2013.01); B32B 2307/412 (2013.01); B32B 2307/536 (2013.01); B32B 2307/558 (2013.01); B32B 2307/712 (2013.01); B32B 2307/736 (2013.01); B32B 2419/00 (2013.01); B32B 2457/20 (2013.01)

(58) Field of Classification Search
USPC ................................................ 528/196, 198
See application file for complete search history.

(56) References Cited

U.S. PATENT DOCUMENTS

2012/0328855 A1  12/2012  Yokogi et al.

FOREIGN PATENT DOCUMENTS

| JP | 4-270652 | 9/1992 |
|---|---|---|
| JP | 2006-36954 | 2/2006 |
| JP | 2006-232987 | 9/2006 |
| JP | 2009-46519 | 3/2009 |
| JP | 2011-156719 | 8/2011 |
| JP | 2011-201304 | 10/2011 |
| JP | 2012-166503 | 9/2012 |
| WO | 2008/020636 | 2/2008 |
| WO | 2011/096089 | 8/2011 |
| WO | 2011/108594 | 9/2011 |
| WO | 2014/133114 | 9/2014 |

OTHER PUBLICATIONS

European Search Report dated Jan. 4, 2017 in corresponding European Application No. 15746624.4.
Communication Pursuant to Article 94(3) EPC dated Jan. 16, 2017 in corresponding European Application No. 15746624.4.
International Search Report dated Apr. 21, 2015 in corresponding International (PCT) Application No. PCT/JP2015/052436.

*Primary Examiner* — Terressa M Boykin
(74) *Attorney, Agent, or Firm* — Wenderoth, Lind & Ponack, L.L.P.

(57) ABSTRACT

Provided is a multilayer body excellent in terms of heat resistance, low water absorbency, shock resistance, surface hardness, and adhesion, including:

at least one layer made of a polycarbonate resin (A) whose main repeating units include a unit (a-1) represented by the following formula:

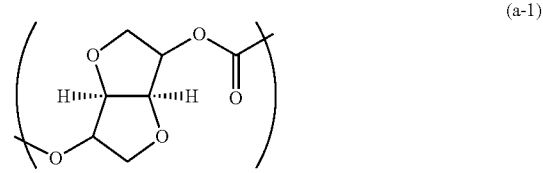

and a unit (a-2) represented by the following formula:

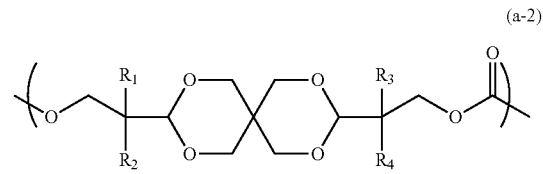

(wherein $R_1$, $R_2$, $R_3$, and $R_4$ are each a hydrogen atom or a $C_{1-5}$ monovalent alkyl group), the unit (a-1) and the unit (a-2) being in a molar ratio (a-1/a-2) of 32/68 to 70/30; and at least one layer made of an aromatic polycarbonate resin (B).

5 Claims, No Drawings

MULTILAYER BODY

TECHNICAL FIELD

The present invention relates to a multilayer body excellent in terms of heat resistance, low water absorbency, impact resistance, surface hardness, and adhesion.

BACKGROUND ART

Polycarbonate resins made from bisphenol A have excellent heat resistance, impact resistance, flame retardancy, and transparency, and thus are widely used, for example, for vehicle applications or as building materials. Of these applications, especially for outdoor applications, high weather resistance is required. However, in general, the weather resistance of a polycarbonate resin is not so good as compared with other transparent materials such as acrylic resins, and yellowing or devitrification occurs upon outdoor exposure. Therefore, various studies have been made on measures for improving the weather resistance of polycarbonates. As one of such methods, a method in which a polycarbonate substrate is covered with an acrylic resin containing a weather-proofing agent has been used (PTL 1). With these methods, some improvement is seen in weather resistance. However, as an instinct problem, it is hard to say that the acrylic resin makes the characteristics of the polycarbonate be fully exerted in terms of impact resistance, heat resistance, and water absorbency. Thus, there has been room for improvement.

In addition, in recent years, out of concerns about the depletion of petroleum resources, and also the problem of increasing carbon dioxide in the air, which causes global warming, much attention has been paid on biomass resources, whose raw materials are not dependent on petroleum, and which satisfy carbon neutral, that is, they do not increase carbon dioxide when combusted. Also in the field of polymers, biomass plastics produced from biomass resources have been vigorously developed. In particular, polycarbonates using isosorbide as a main monomer have excellent heat resistance, weather resistance, surface hardness, and chemical resistance, and their characteristics are different from those of ordinary polycarbonates made from bisphenol A. For this reason, they are attracting attention, and various studies have been made (PTLs 2 and 3). Such isosorbide polycarbonates have excellent heat resistance, impact resistance, and weather resistance. Meanwhile, their adhesion to general bisphenol A polycarbonates has not been considered. In really, the adhesion to bisphenol A polycarbonates is significantly low, and it has been difficult to form a multilayer body.

In PTLs 4 and 5, a laminate with a bisphenol A polycarbonate is disclosed as a specific configuration. However, such a laminate is problematic in that the heat resistance and surface hardness of the isosorbide polycarbonate of the adhesion layer are low, requiring another coating layer, and also that the adhesion is significantly poor.

In PTLs 6 and 7, a copolymerization composition having isosorbide and a spirocyclic skeleton is shown. However, it is intended to be used for optical film applications, and there is no description of the viewpoint as a laminate with a bisphenol A polycarbonate.

Accordingly, a multilayer body excellent in terms of heat resistance, low water absorbency, impact resistance, surface hardness, and adhesion have not yet been provided.

CITATION LIST

Patent Literature

PTL 1: JP-A-4-270652
PTL 2: JP-A-2006-36954
PTL 3: JP-A-2009-46519
PTL 4: JP-A-2011-156719
PTL 5: JP-A-2011-201304
PTL 6: WO 2008/020636
PTL 7: JP-A-2006-232987

SUMMARY OF INVENTION

Technical Problem

An object of the invention is to provide a multilayer body excellent in terms of heat resistance, low water absorbency, impact resistance, surface hardness, and adhesion.

Solution to Problem

The present inventors have conducted extensive research. As a result, they have found that when isosorbide and, as a copolymerization monomer, a monomer having a specific spirocyclic structure are contained in a certain ratio, excellent heat resistance, low water absorbency, impact resistance, and surface hardness are given, and also the adhesion to aromatic polycarbonates can be significantly improved. The invention has thus been accomplished.

That is, according to the invention, the object of the invention can be achieved by the following items.

1. A multilayer body including:

at least one layer made of a polycarbonate resin (A) whose main repeating units include a unit (a-1) represented by the following formula:

[Chemical Formula 1]

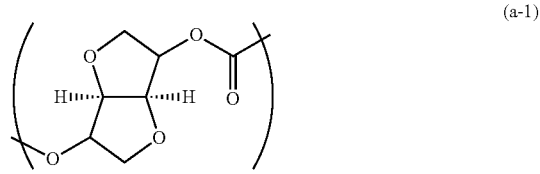

and a unit (a-2) represented by the following formula:

[Chemical Formula 2]

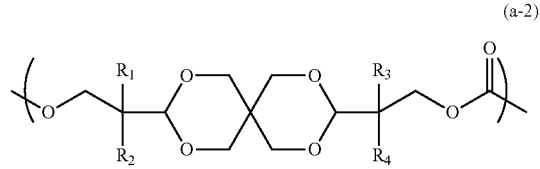

(wherein $R_1$, $R_2$, $R_3$, and $R_4$ are each a hydrogen atom or a $C_{1-5}$ alkyl group), the unit (a-1) and the unit (a-2) being in a molar ratio (a-1/a-2) of 32/68 to 70/30; and at least one layer made of an aromatic polycarbonate resin (B).

2. The multilayer body according to item 1 above, wherein the aromatic polycarbonate resin (B) is a polycarbonate resin made from bisphenol A.

3. The multilayer body according to item 1 above, wherein the polycarbonate resin (A) has a glass transition temperature of 110° C. to 145° C.

4. The multilayer body according to item 1 above, wherein the polycarbonate resin (A) has a saturated water absorption of 2.0% or less.

5. The multilayer body according to item 1 above, wherein the layer made of a polycarbonate resin (A) has a surface hardness of F or higher.

Advantageous Effects of the Invention

According to the invention, a layer made of a polycarbonate resin containing, as structural units, isosorbide and a diol having a spirocyclic structure in a certain ratio and a layer made of an aromatic polycarbonate resin are laminated, thereby making it possible to provide a multilayer body having excellent characteristics in terms of heat resistance, low water absorbency, impact resistance, and surface hardness and also having excellent adhesion. Accordingly, the resulting industrial effects are remarkable.

DESCRIPTION OF EMBODIMENTS

The invention will be described in detail hereinafter.
<Polycarbonate Resin>
(Polycarbonate Resin (A))

Main repeating units of the polycarbonate resin (A) of the invention are configured by a unit (a-1) and a unit (a-2). "Main repeating units" means that the total of the unit (a-1) and the unit (a-2) based on the entire repeating units is 50 mol % or more, preferably 60 mol % or more, more preferably 70 mol % or more, and still more preferably 80 mol % or more.

(Unit (a-1))

The unit (a-1) in the invention is, as shown in the above formula (a-1), derived from an aliphatic diol having an ether group.

In the above formula (a-1), among biomass resources, a diol having an ether bond is a material having high heat resistance and pencil hardness.

As the formula (a-1), repeating units (a-1-1), (a-1-2), and (a-1-3) represented by the following formulae, which are in stereoisomeric relationships, are illustrated.

[Chemical Formula 3]

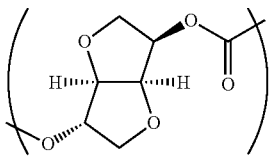

(a-1-1)

[Chemical Formula 4]

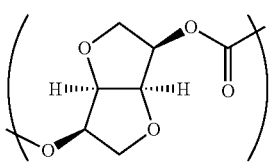

(a-1-2)

[Chemical Formula 5]

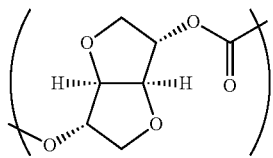

(a-1-3)

These are ether diols derived from carbohydrates, which are substances obtainable also from biomass in nature and one of substances called renewable sources. The repeating units (a-1-1), (a-1-2), and (a-1-3) are called isosorbide, isomannide, and isoidide, respectively. Isosorbide is obtained by hydrogenating D-glucose obtained from starch, followed by dehydration. Other ether diols can also be obtained from the same reaction, except for the starting materials.

Among isosorbide, isomannide, and isoidide, a repeating unit derived from isosorbide (1,4;3,6-dianhydro-D-sorbitol) is easy to produce and has excellent heat resistance, and thus is particularly preferable.

(Unit (a-2))

The unit (a-2) in the invention is derived from a diol having a spirocyclic structure. Examples of diol compounds having a spirocyclic structure include alicyclic diol compounds such as 3,9-bis(2-hydroxyethyl)-2,4,8,10-tetraoxaspiro(5.5)undecane, 3,9-bis(2-hydroxy-1,1-dimethylethyl)-2,4,8,10-tetraoxaspiro(5.5)undecane, 3,9-bis(2-hydroxy-1,1-diethylethyl)-2,4,8,10-tetraoxaspiro(5.5)undecane, and 3,9-bis(2-hydroxy-1,1-dipropylethyl)-2,4,8,10-tetraoxaspiro(5.5)undecane.

It is preferable to use 3,9-bis(2-hydroxy-1,1-dimethylethyl)-2,4,8,10-tetraoxaspiro(5.5)undecane.

(Other Units)

Diol compounds that derive other units aside from the unit (a-1) and the unit (a-2) may be any of other aliphatic diol compounds, alicyclic diol compounds, and aromatic dihydroxy compounds. Examples thereof include diol compounds described in WO 2004/111106 and WO 2011/021720 and oxyalkylene glycols such as diethylene glycol, triethylene glycol, tetraethylene glycol, and polyethylene glycol.

Examples of aliphatic diol compounds include 1,3-propanediol, 1,4-butanediol, 1,5-pentanediol, 1,6-hexanediol, 1,8-octanediol, 1.9-nonanediol, 1,10-decanediol, 1,12-dodecanediol, 2-methyl-1,3-propanediol, neopentyl glycol, 3-methyl-1,5-pentanediol, 2-n-butyl 2-ethyl-1,3-propanediol, 2,2-diethyl-1,3-propanediol, 2,4-diethyl-1,5-pentanediol, 1,2-hexaneglycol, 1,2-octylglycol, 2-ethyl-1,3-hexanediol, 2,3-diisobutyl-1,3-propanediol, 2,2-diisoamyl-1,3-propanediol, and 2-methyl-2-propyl-1,3-propanediol.

Examples of alicyclic diol compounds include cyclohexane dimethanol, tricyclodecane dimethanol, adamantanediol, pentacyclopentadecane dimethanol, and 2,2,4,4-tetramethyl-1,3-cyclobutanediol.

Examples of aromatic dihydroxy compounds include α,α'-bis(4-hydroxyphenyl)-m-diisopropylbenzene (bisphenol M), 9,9-bis(4-hydroxy-3-methylphenyl)fluorene, 1,1-bis(4-hydroxyphenyl)cyclohexane, 1,1-bis(4-hydroxyphenyl)-3,3,5-trimethylcyclohexane, 4,4'-dihydroxy-3,3'-dimethyldiphenylsulfide, bisphenol A, 2,2-bis(4-hydroxy-3-methylphenyl)propane (bisphenol C), 2,2-bis(4-hydroxyphenyl)-1,1,1,3,3,3-hexafluoropropane (bisphenol AF), and 1,1-bis(4-hydroxyphenyl)decane.

(Composition)

Main repeating units of the polycarbonate resin (A) used in the invention include a unit (a-1) and a unit (a-2), and their molar ratio (a-1/a-2) is 32/68 to 70/30. When the molar ratio (a-1/a-2) is 32/68 to 70/30, heat resistance and surface hardness become high, also adhesion to bisphenol A polycarbonates is exerted, and thus is preferable. The molar ratio (a-1/a-2) between the unit (a-1) and the unit (a-2) is preferably 40/60 to 70/30, more preferably 45/55 to 70/30, and still more preferably 50/50 to 70/30. When the composition is within this range, the balance between adhesion to bisphenol A polycarbonates and heat resistance is particularly excellent, and this is thus more preferable. Incidentally, in the case where the molar ratio (a-1/a-2) is less than 32/68, the heat resistance is low, while in the case where the ratio (a-1/a-2) is more than 70/30, the water absorption is high, resulting in the deterioration of adhesion to bisphenol A polycarbonates. The molar ratio (a-1/a-2) can be measured and calculated using Proton NMR of JNM-AL400 manufactured by JEOL Ltd.

(Production Method for Polycarbonate Resin (A))

The polycarbonate resin (A) is produced by a reaction means for producing an ordinary polycarbonate resin, which itself is a known method, such as by allowing a carbonic acid diester or like carbonate precursor to react with a diol component. Next, basic techniques for such production methods will be briefly described.

A transesterification reaction using a carbonic acid diester as a carbonate precursor is carried out by a method in which a predetermined proportion of a diol component is stirred with a carbonic acid diester with heating in an inert gas atmosphere, and the produced alcohol or phenol is distilled. The reaction temperature depends on the boiling point of the produced alcohol or phenol, etc., but is usually within a range of 120 to 300° C. The reaction is carried out at reduced pressure from the initial stage, and the reaction is completed while distilling the produced alcohol or phenol. In addition, as necessary, an end terminator, an antioxidant, or the like may also be added.

Examples of carbonic acid diesters used for the transesterification reaction include esters of optionally substituted $C_{6-12}$ aryl groups and aralkyl groups. Specific examples thereof include diphenyl carbonate, ditolyl carbonate, bis(chlorophenyl)carbonate, and m-cresyl carbonate. Among them, diphenyl carbonate is particularly preferable. The amount of diphenyl carbonate used is preferably 0.97 to 1.10 mol, more preferably 1.00 to 1.06 mol, per mol of the total dihydroxy compound.

In addition, in a melt-polymerization method, a polymerization catalyst may be used to increase the polymerization rate. Examples of such polymerization catalysts include alkali metal compounds, alkaline earth metal compounds, nitrogen-containing compounds, and metal compounds.

As such compounds, organic acid salts, inorganic salts, oxides, hydroxides, hydrides, alkoxides, and quaternary ammonium hydroxides of alkali metals and alkaline earth metals, for example, are preferably used. These compounds may be used alone or in combination.

Examples of alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenyl phosphate, disodium salt, dipotassium salt, dicesium salt, and dilithium salt of bisphenol A, and sodium salt, potassium salt, cesium salt, and lithium salt of phenol.

Examples of alkaline earth metal compounds include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate, barium diacetate, and barium stearate.

Examples of nitrogen-containing compounds include quaternary ammonium hydroxides having an alkyl or aryl group, etc., such as tetramethylammonium hydroxide, tetraethylammonium hydroxide, tetrapropylammonium hydroxide, tetrabutylammonium hydroxide, and trimethylbenzylammonium hydroxide. Examples also include tertiary amines, such as triethylamine, dimethylbenzylamine, and triphenylamine, and imidazoles, such as 2-methylimidazole, 2-phenylimidazole, and benzimidazole. Examples also include bases and basic salts such as ammonia, tetramethylammonium borohydride, tetrabutylammonium borohydride, tetrabutylammonium tetraphenylborate, and tetraphenylammonium tetraphenylborate.

Examples of metal compounds include zinc aluminum compounds, germanium compounds, organotin compounds, antimony compounds, manganese compounds, titanium compounds, and zirconium compounds. These compounds may be used alone, and it is also possible to use two or more kinds together.

The amount of polymerization catalyst used is selected from a range of preferably $1 \times 10^{-9}$ to $1 \times 10^{-2}$ equivalents, preferably $1 \times 10^{-8}$ to $1 \times 10^{-5}$ equivalents, and more preferably $1 \times 10^{-7}$ to $1 \times 10^{-3}$ equivalents, per mol of the diol component.

In addition, it is also possible to add a catalyst deactivator after the reaction. As catalyst deactivators to be used, known catalyst deactivators are effectively used. Among them, an ammonium salt or phosphonium salt of sulfonic acid is preferable. Further, salts of dodecylbenzenesulfonic acid, such as tetrabutylphosphonium dodecylbenzenesulfonate, and salts of p-toluenesulfonic acid, such as tetrabutylammonium p-toluenesulfonate, are preferable.

In addition, as esters of sulfonic acid, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, and phenyl p-toluenesulfonate are preferably used. Among them, it is most preferable to use tetrabutylphosphonium dodecylbenzenesulfonate.

With respect to the amount of catalyst deactivator used, in the case where at least one polymerization catalyst selected from alkali metal compounds and/or alkaline earth metal compounds is used, the catalyst deactivator may be used preferably in a proportion of 0.5 to 50 mol, more preferably in a proportion of 0.5 to 10 mol, and still more preferably in a proportion of 0.8 to 5 mol, per mol of the catalyst.

(Specific Viscosity: $\eta_{SP}$) The specific viscosity ($\eta_{SP}$) of the polycarbonate resin (A) is preferably 0.2 to 1.5. When the specific viscosity is within a range of 0.2 to 1.5, the formed article has excellent strength and forming workability. The specific viscosity is more preferably 0.25 to 1.2, still more preferably 0.3 to 1.0, and particularly preferably 0.3 to 0.5.

Specific viscosity in the context of the invention is determined from a solution prepared by dissolving 0.7 g of a polycarbonate resin in 100 ml of methylene chloride at 20° C. using an Ostwald viscometer.

$$\text{Specific Viscosity}(\eta_{SP})=(t-t_0)/t_0$$

[$t_0$ is the number of seconds taken for methylene chloride to fall, and t is the number of seconds taken for the sample solution to fall]

Incidentally, the measurement of specific viscosity can be performed specifically in the following manner, for example. First, a polycarbonate resin is dissolved in 20 to 30 times the weight of methylene chloride, followed by Celite filtration to collect solubles. Subsequently, the solution is removed, followed by sufficient drying, thereby giving a solid of methylene chloride solubles. 0.7 g of the solid is dissolved in 100 ml of methylene chloride, and the specific viscosity of the resulting solution at 20° C. is determined using an Ostwald viscometer.

(Glass Transition Temperature: Tg)

The glass transition temperature (Tg) of the polycarbonate resin (A) is preferably 110 to 145° C., and more preferably 115 to 140° C. When the Tg is 110 to 145° C., good heat-resistant stability and formability are exerted when used as an optical formed body, and thus is preferable.

Glass transition temperature (Tg) is measured using DSC 2910 manufactured by TA Instruments Japan at a temperature rise rate of 20° C./min.

(Saturated Water Absorption)

The saturated water absorption of the polycarbonate resin (A) is preferably 2.0% or less, more preferably 1.8% or less, and still more preferably 1.5% or less. When the water absorption of 2.0% or less, the dimensional change or warping of the formed article due to water absorption can be reduced, and this is thus preferable.

(Pencil Hardness)

It is preferable that the layer made of a polycarbonate resin (A) has a pencil hardness of F or higher. In terms of providing excellent scratch resistance, the pencil hardness is preferably H or higher. Incidentally, when the pencil hardness is not higher than 4 H, the function is sufficient. The pencil hardness can be increased by increasing the composition of the repeating unit (B) based on the entire repeating units. In the invention, pencil hardness is such hardness that no scratch mark is left when the resin of the invention is scratched with a pencil having a specific pencil hardness, and it is preferable to use, as an index, pencil hardness used for the coating surface hardness test, which is measurable in accordance with JIS K-5600. As indicated by pencil hardness, softness increases in the following order: 9H, 8H, 7H, 6H, 5H, 4H, 3H, 2H, H, F, HB, B, 2B, 3B, 4B, 5B, 6B, where 9H is the hardest, while 6B is the softest.

(Aromatic Polycarbonate Resin (B))

The aromatic polycarbonate resin (B) may be a homopolymer or a copolymer. In addition, the aromatic polycarbonate resin (B) may have a branched structure or a linear structure, or also may be a mixture of a branched structure and a linear structure.

As a production method for the aromatic polycarbonate resin (B) using a dihydric phenol as a raw material, any of known methods, such as a phosgene method, a transesterification method, and a pyridine method, may be used.

Typical examples of dihydric phenols are bisphenols. In particular, it is preferable to use 2,2-bis(4-hydroxyphenyl) propane, that is, bisphenol A. In addition, bisphenol A may be totally or partially substituted with other dihydric phenols. Examples of other dihydric phenols include bis(4-hydroxyphenyl)alkanes such as hydroquinone, 4,4-dihydroxydiphenyl, bis(4-hydroxyphenyl)methane, and 1,1-bis (4-hydroxyphenyl)ethane, bis(4-hydroxyphenyl) cycloalkanes such as 1,1-bis(4-hydroxyphenyl)cyclohexane, compounds such as bis(4-hydroxyphenyl)sulfide, bis(4-hydroxyphenyl)sulfone, bis(4-hydroxyphenyl)sulfoxide, and bis(4-hydroxyphenyl)ether, alkylated bisphenols such as 2,2-bis(3-methyl-4-hydroxyphenyl)propane and 2,2-bis(3,5-dimethyl-4-hydroxyphenyl)propane, and halogenated bisphenols such as 2,2-bis(3,5-dibromo-4-hydroxyphenyl)propane and 2,2-bis(3,5-dichloro-4-hydroxyphenyl)propane.

In terms of the balance between dynamic characteristics and forming workability, the viscosity average molecular weight of the aromatic polycarbonate resin (B) used in the invention is within a range of preferably 15,000 or more and 30,000 or less, and more preferably 20,000 or more and 27,000 or less. Here, the viscosity average molecular weight (M) of the polycarbonate resin (B) is determined by inserting the specific viscosity ($\eta_{SP}$) determined from a solution prepared by dissolving 0.7 g of a polycarbonate resin in 100 ml of methylene chloride at 20° C. using an Ostwald viscometer into the following equation.

$$\eta_{SP}/c=[\eta]+0.45\times[\eta]^2c \text{ (wherein } [\eta] \text{ is intrinsic viscosity)}$$

$$[\eta]=1.23\times10^{-4}M^{0.83}$$

c=0.7

In addition, the reduced viscosity of the aromatic polycarbonate resin (B) is measured at a temperature of 20.0° C.±0.10° C. using methylene chloride as a solvent at a polycarbonate concentration accurately adjusted to 0.60 g/dl, and is within a range of preferably 0.23 dl/g or more and 0.72 dl/g or less, and more preferably 0.27 dl/g or more and 0.61 dl/g or less.

(Additive)

In the polycarbonate resins used in the invention, according to the intended use or as necessary, additives such as heat stabilizers, plasticizers, light stabilizers, polymerization metal deactivators, flame retarders, lubricants, antistatic agents, surfactants, antimicrobials, UV absorbers, and release agents may be incorporated.

(Heat Stabilizer)

In the polycarbonate resins used in the invention, it is particularly preferable that a heat stabilizer is contained in order to suppress the molecular weight reduction and hue deterioration at the time of extrusion/forming. Examples of heat stabilizers include phosphorus heat stabilizers, phenol heat stabilizers, and sulfur heat stabilizers, and they may be used alone, and it is also possible to use two or more kinds together. In particular, because an ether diol residue of the unit (a-1) is likely to be degraded by heat and oxygen and colored, it is preferable that a phosphorus heat stabilizer is contained as a heat stabilizer. As a phosphorus stabilizer, it is preferable that a phosphite compound is incorporated. Examples of phosphite compounds include pentaerythritol phosphite compounds, phosphite compounds obtained by a reaction of a dihydric phenol to have a cyclic structure, phosphite compounds having other structures.

Specific examples of pentaerythritol phosphite compounds mentioned above include bis(2,6-di-tert-butyl-4-methylphenyl)pentaerythritoldiphosphite, bis(2,6-di-tert-butyl-4-ethylphenyl)pentaerythritoldiphosphite, phenylbisphenol A pentaerythritoldiphosphite, bis(nonylphenyl)pentaerythritoldiphosphite, and dicyclohexyl pentaerythritoldiphosphite. Among them, distearylpentaerythritoldiphosphite and bis(2,4-di-tert-butylphenyl) pentaerythritoldiphosphite are suitable.

Examples of phosphite compounds obtained by a reaction of a dihydric phenol to have a cyclic structure mentioned above include 2,2'-methylenebis(4,6-di-tert-butylphenyl) (2,4-di-tert-butyl phenyl)phosphite, 2,2'-methylenebis(4,6-di-tert-butylphenyl) (2-tert-butyl-4-methylphenyl)phosphite, 2,2'-methylenebis(4-methyl-6-tert-butylphenyl) (2-tert-butyl-4-methylphenyl)phosphite, 2,2'-ethylidenebis (4-methyl-6-tert-butylphenyl) (2-tert-butyl-4-methylphenyl) phosphite, 2,2'-methylene-bis-(4,6-di-t-butylphenyl)octylphosphite, and 6-tert-butyl-4-[3-[(2,4,8,10)-tetra-tert-butyldibenzo[d,f][1,3,2]dioxaphosphepine-6-yl)oxy]propyl]-2-methylphenol.

Examples of phosphite compounds having other structures mentioned above include triphenyl phosphite, tris (nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tris (di-n-butylphenyl)phosphite, tris(2,4-di-tert-butylphenyl) phosphite, and tris(2,6-di-tert-butylphenyl)phosphite.

Aside from the various phosphite compounds, for example, phosphate compounds, phosphonite compounds, and phosphonate compounds can be mentioned.

Examples of phosphate compounds include tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxyethyl phosphate, dibutyl phosphate, dioctyl phosphate, and diisopropyl phosphate, and triphenyl phosphate and trimethyl phosphate are preferable.

Examples of phosphonite compounds include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite. Tetrakis(di-tert-butylphenyl)-biphenylene diphosphonite and bis(di-tert-butylphenyl)-phenyl-phenyl phosphonite are preferable, and tetrakis(2,4-di-tert-butylphenyl)-biphenylene diphosphonite and bis(2,4-di-tert-butylphenyl)-phenyl-phenyl phosphonite are more preferable. Such phosphonite compounds can be used together with the above phosphite compounds having an aryl group with two or more alkyl groups as substituents, and thus are preferable.

Examples of phosphonate compounds include dimethyl benzenephosphonate, diethyl benzenephosphonate, and dipropyl benzenephosphonate.

Among the phosphorus heat stabilizers mentioned above, trisnonylphenyl phosphite, trimethyl phosphate, tris(2,4-di-tert-butylphenyl)phosphite, bis(2,4-di-tert-butylphenyl)pentaerythritol diphosphite, and bis(2,6-di-tert-butyl-4-methylphenyl)pentaerythritol diphosphite are preferably used.

The above phosphorus heat stabilizers may be used alone, and it is also possible to use two or more kinds together. The phosphorus heat stabilizer is incorporated in an amount of preferably 0.001 to 1 part by weight, more preferably 0.01 to 0.5 parts by weight, and still more preferably 0.01 to 0.3 parts by weight, per 100 parts by weight of the polycarbonate resin.

In the polycarbonate resins used in the invention, for the purpose of suppressing the molecular weight reduction and hue deterioration at the time of extrusion/forming, a hindered phenolic heat stabilizer or a sulfur heat stabilizer may be added in combination with a phosphorus heat stabilizer as heat stabilizers.

Hindered phenolic heat stabilizers are not particularly limited as long as they have antioxidant functions, and examples thereof include n-octadecyl-3-(4'-hydroxy-3',5'-di-t-butylphenyl)propionate, tetrakis{methylene-3-(3',5'-di-t-butyl-4-hydroxyphenyl)propionate}methane, distearyl(4-hydroxy-3-methyl-5-t-butylbenzyl)malonate, triethyleneglycol-bis{3-(3-t-butyl-5-methyl-4-hydroxyphenyl)propionate}, 1,6-hexanediol-bis{3-(3,5-di-t-butyl-4-hydroxyphenyl)propionate}, pentaerythrityl-tetrakis{3-(3,5-di-t-butyl-4-hydroxyphenyl)propionate}, 2,2-thiodiethylenebis{3-(3,5-di-t-butyl-4-hydroxyphenyl) propionate}, 2,2-thiobis(4-methyl-6-t-butylphenol), 1,3,5-trimethyl-2,4,6-tris(3,5-di-t-butyl-4-hydroxybenzyl) benzene, tris(3,5-di-t-butyl-4-hydroxybenzyl)-isocyanurate, 2,4-bis{(octylthio)methyl}-o-cresol, isooctyl-3-(3,5-di-t-butyl-4-hydroxyphenyl)propionate, 2,5,7,8-tetramethyl-2 (4',8',12'-trimethyltridecyl)chroman-6-ol, and 3,3',3",5,5',5"-hexa-t-butyl-a,a',a"-(mesitylene-2,4,6-tri yl)tri-p-cresol.

Among them, n-octadecyl-3-(4'-hydroxy-3',5'-di-t-butylphenyl)propionate, pentaerythrityl-tetrakis{3-(3,5-di-t-butyl-4-hydroxyphenyl)propionate}, 3,3',3",5,5',5"-hexa-t-butyl-a,a',a'-(mesitylene-2,4,6-tri yl)tri-p-cresol, 2,2-thiodiethylenebis{3-(3,5-di-t-butyl-4-hydroxyphenyl) propionate}, and the like are preferable.

These hindered phenolic heat stabilizers may be used alone, and it is also possible to use two or more kinds together.

The hindered phenolic heat stabilizer is incorporated in an amount of preferably 0.001 to 1 part by weight, more preferably 0.01 to 0.5 parts by weight, and still more preferably 0.01 to 0.3 parts by weight, per 100 parts by weight of the polycarbonate resin.

Examples of sulfur heat stabilizers include dilauryl 3,3'-thiodipropionate, ditridecyl 3,3'-thiodipropionate, dimyristyl 3,3'-thiodipropionate, distearyl 3,3'-thiodipropionate, lauryl stearyl 3,3' thiodipropionate, pentaerythritol tetrakis (3-laurylthiopropionate), bis[2-methyl-4-(3-laurylthiopropionyloxy)-5-tert-butylphenyl]sulfide, octadecyl disulfide, mercaptobenzimidazole 2-mercapto-6-methylbenzimidazole, and 1,1'-thiobis(2-naphthol). Among them, pentaerythritol tetrakis(3-laurylthiopropionate) is preferable.

These sulfur heat stabilizers may be used alone, and it is also possible to use two or more kinds together.

The sulfur heat stabilizer is incorporated in an amount of preferably 0.001 to 1 part by weight, more preferably 0.01 to 0.5 parts by weight, and still more preferably 0.01 to 0.3 parts by weight, per 100 parts by weight of the polycarbonate resin.

In the case where a phosphite heat stabilizer, a phenol heat stabilizer, and a sulfur heat stabilizer are used together, they are incorporated in a total amount of preferably 0.001 to 1 part by weight, more preferably 0.01 to 0.3 parts by weight, per 100 parts by weight of the polycarbonate resin.

(Release Agent)

In the polycarbonate resins used in the invention, in order to further improve the mold release properties at the time of melt-forming, a release agent may also be incorporated to the extent that does not interfere the object of the invention.

Examples of such release agents include higher fatty acid esters of monohydric or polyhydric alcohols, higher fatty acids, paraffin wax, beeswax, olefin waxes, olefin waxes containing carboxy groups and/or carboxylic anhydride groups, silicone oil, and organopolysiloxane.

Examples of higher fatty acid esters include partial esters or total esters of a $C_{1-20}$ monohydric or polyhydric alcohol and a $C_{10-30}$ saturated fatty acid. Examples of such partial esters or total esters of a monohydric or polyhydric alcohol and a saturated fatty acid include monoglyceride stearate, diglyceride stearate, triglyceride stearate, monosorbitate stearate, stearyl stearate, monoglyceride behenate, behenyl behenate, pentaerythritol monostearate, pentaerythritol tetrastearate, pentaerythritol tetrapelargonate, propyleneglycol monostearate, stearyl stearate, palmityl palmitate, butyl stearate, methyl laurate, isopropyl palmitate, biphenyl biphenate, sorbitan monostearate, and 2-ethylhexyl stearate.

Among them, monoglyceride stearate, triglyceride stearate, pentaerythritol tetrastearate, and behenyl behenate are preferably used.

As higher fatty acids, $C_{10-30}$ saturated fatty acids are preferable. Examples of such fatty acids include myristic acid, lauric acid, palmitic acid, stearic acid, and behenic acid.

These release agents may be used alone, and it is also possible to use two or more kinds together. The amount of such a release agent incorporated is preferably 0.01 to 5 parts by weight per 100 parts by weight of the polycarbonate resin.

(UV Absorber)

The polycarbonate resins used in the invention may contain a UV absorber. Examples of UV absorbers include benzotriazole UV absorbers, benzophenone UV absorbers, triazine UV absorbers, cyclic iminoester UV absorbers, and cyanoacrylate UV absorbers. Among them, benzotriazole UV absorbers are preferable.

Examples of benzotriazole UV absorbers include benzotriazole UV absorbers such as 2-(2'-hydroxy-5'-methylphenyl)benzotriazole, 2-(2'-hydroxy-5'-tert-butylphenyl)benzotriazole, 2-(2'-hydroxy-5'-tert-octylphenyl)benzotriazole, 2-(2'-hydroxy-3',5'-di-tert-butylphenyl)benzotriazole, 2-(2'-hydroxy-3',5'-di-tert-amylphenyl)benzotriazole, 2-(2'-hydroxy-3'-dodecyl-5'-methylphenyl)benzotriazole, 2-(2'-hydroxy-3',5'-bis(α,α'-dimethylbenzyl)phenylbenzotriazole, 2-[2'-hydroxy-3'-(3",4",5",6"-tetra-phthalimidomethyl)-5'-methylphenyl]benzotriazole, 2-(2'-hydroxy-3'-tert-butyl-5'-methylphenyl)-5-chlorobenzo triazole, 2-(2'-hydroxy-3',5'-di-tert-butylphenyl)-5-chlorobenzotriazole, 2,2'methylenebis[4-(1,1,3,3-tetrametylbutyl)-6-(2H-benzotriazol-2-yl)phenol], and methyl-3-[3-tert-butyl-5-(2H-benzotriazol-2-yl)-4-hydroxyphenyl propionate-polyethylene glycol condensates.

The proportion of such a UV absorber is preferably 0.01 to 2 parts by weight, more preferably 0.1 to 1 part by weight, and still more preferably 0.2 to 0.5 parts by weight, per 100 parts by weight of the polycarbonate resin.

(Light Stabilizer)

The polycarbonate resins used in the invention may contain a light stabilizer. The presence of a light stabilizer is preferable in terms of weather resistance and also has an advantage in that the formed article is resistant to cracking.

Examples of light stabilizers include hindered amines, such as 1,2,2,6,6-pentamethyl-4-piperidyl methacrylate, bis(2,2,6,6-tetramethyl-1-octyloxy-4-piperidinyl)didecanoate, bis(1,2,2,6,6-pentamethyl-4-piperidinyl)-[[3,5-bis(1,1-dimethylethyl)-4-hydroxyphenyl]methyl]butylmalonate, 2,4-bis[N-butyl-N-(1-cyclohexyloxy-2,2,6,6-tetramethylpiperidin-2-yl)amino]-6-(2-hydroxyethylamine)-1,3,5-triazine, bis(1,2,2,6,6-tetramethyl-4-piperidinyl)sebacate, methyl(1,2,2,6,6-pentamethyl-4-piperidinyl)sebacate, bis(2,2,6,6-tetramethyl-4-piperidyl)carbonate, bis(2,2,6,6-tetramethyl-4-piperidyl)succinate, bis(2,2,6,6-tetramethyl-4-piperidyl)sebacate, 4-benzoyloxy-2,2,6,6-tetramethylpiperidine, 4-octanoyloxy-2,2,6,6-tetramethylpiperidine, bis(2,2,6,6-tetramethyl-4-piperidyl)diphenylmethane-p,p'-dicarbamate, bis(2,2,6,6-tetramethyl-4-piperidyl)benzene-1,3-disulfonate, and bis(2,2,6,6-tetramethyl-4-piperidyl)phenyl phosphite, and nickel complexes, such as nickel bis(octylphenyl sulfide, nickel complex-3,5-di-t-butyl-4-hydroxybenzyl phosphate monoethylate, and nickel dibutyldithiocarbamate. These light stabilizers may be used alone, and it is also possible to use two or more kinds together. The light stabilizer content is preferably 0.001 to 1 part by weight, more preferably 0.01 to 0.5 parts by weight, per 100 parts by weight of the polycarbonate resin.

(Epoxy Stabilizer)

In the polycarbonate resins used in the invention, in order to improve the hydrolyzability, an epoxy compound may be incorporated without interfering with the object of the invention of the present application.

Examples of epoxy stabilizers include epoxidized soybean oil, epoxidized linseed oil, phenyl glycidyl ether, allyl glycidyl ether, t-butylphenyl glycidyl ether, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexyl ethyleneoxide, cyclohexylmethyl-3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, diglycidyl ester of phthalic acid, diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-t-butyl-4,5-epoxytetrahydrophthalic anhydride, diethyl-4,5-epoxy-cis-1,2-cyclohexyl dicarboxylate, and di-n-butyl-3-t-butyl-4,5-epoxy-cis-1,2-cyclohexyl dicarboxylate. Bisphenol A diglycidyl ether is preferable in terms of compatibility, etc.

It is preferable that such an epoxy stabilizer is incorporated in an amount within a range of 0.0001 to 5 parts by weight, preferably 0.001 to 1 part by weight, and still more preferably 0.005 to 0.5 parts by weight, per 100 parts by weight of the polycarbonate resin.

(Bluing Agent)

In the polycarbonate resins used in the invention, in order to cancel out a yellow tinge of a lens caused by the polymer or UV absorber, a bluing agent may be incorporated. As bluing agents, those used for polycarbonates may be used without any particular inconvenience. Generally, anthraquinone dyes are easily obtainable and thus preferable.

Specifically, typical examples of bluing agents include generic name: Solvent Violet 13 [CA. No. (Color Index No.) 60725], generic name: Solvent Violet 31 [CA. No. 68210, generic name: Solvent Violet 33 [CA. No. 60725], generic name: Solvent Blue 94 [CA. No. 61500], generic name: Solvent Violet 36 [CA. No. 68210], generic name: Solvent Blue 97 ["Macrolex Violet RR" manufactured by Bayer], and generic name: Solvent Blue 45 [CA. No. 61110].

These bluing agents may be used alone, and it is also possible to use two or more kinds together. Such a bluing agent is preferably incorporated in a proportion of $0.1 \times 10^{-4}$ to $2 \times 10^{-4}$ parts by weight per 100 parts by weight of the polycarbonate resin.

(Flame Retarder)

In the polycarbonate resins used in the invention, a flame retarder may also be incorporated. Examples of flame retarders include halogen flame retardants such as brominated epoxy resins, brominated polystyrenes, brominated polycarbonates, brominated polyacrylates, and chlorinated polyethylenes, phosphate flame retarders such as monophosphate compounds and phosphate oligomer compounds, organic phosphorus flame retarders other than phosphate flame retarders, such as phosphinate compounds, phosphonate compounds, phosphonitrile oligomer compounds, and phosphonic amide compounds, and organometallic salt flame retarders such as alkaline (earth) metal organic sulfonates, metallic borate flame retarders, and metallic stannate flame retarders, as well as silicone flame retarders, ammonium polyphosphate flame retarders, and triazine flame retarders. In addition, separately, flame-retardant synergists (e.g., sodium antimonate, antimony trioxide, etc.), dripping inhibitors (fibril-forming polytetrafluoroethylene, etc.) and the like may also be incorporated and used together with the flame retarder.

Among the above flame retarders, compounds containing no chlorine or bromine atom reduce the factors considered to be undesirable for incineration disposal and thermal recycling. Such compounds are thus more suitable as flame retarders for use in the formed article of the invention, which reduces the environmental impact as one feature.

In the case where a flame retarder is incorporated, it is preferable that the amount is within a range of 0.05 to 50 parts by weight per 100 parts by weight of the polycarbonate resin. When the amount is less than 0.05 parts by weight, sufficient flame retardancy is not developed, while when the amount is more than 50 parts by weight, the strength, heat resistance, and the like of the formed article are impaired.

(Elastomeric Polymer)

In the polycarbonate resins used in the invention, an elastomeric polymer may be used as an impact modifier. Examples of elastomeric polymers include natural rubber and graft copolymers obtained by copolymerizing, with a rubber component having a glass transition temperature of 10° C. or less, one kind or two or more kinds of monomer selected from aromatic vinyls, vinyl cyanide, acrylic acid esters, methacrylic acid esters, and vinyl compounds copolymerizable therewith. More suitable elastomeric polymers are core-shell type graft copolymers obtained by graft copolymerization of one kind or two or more kinds of shell monomer with a core rubber component.

In addition, examples also include block copolymers of such a rubber component and the above monomer. Specific examples of such block copolymers include thermoplastic elastomers such as a styrene-ethylene propylene-styrene elastomer (hydrogenated styrene-isoprene-styrene elastomer) and a hydrogenated styrene-butadiene-styrene elastomer. Further, it is also possible to use other various elastomeric polymers known as thermoplastic elastomers, such as a polyurethane elastomer, a polyester elastomer, and a polyetheramide elastomer.

As impact modifiers, core-shell type graft copolymers are more suitable. In a core-shell type graft copolymer, the particle size of the core is, as a weight average particle size, preferably 0.05 to 0.8 m, more preferably 0.1 to 0.6 m, and still more preferably 0.1 to 0.5 m. When the size is within a range of 0.05 to 0.8 m, even better impact resistance is achieved. The rubber component content in the elastomeric polymer is preferably 40% or more, and still more preferably 60% or more.

Examples of rubber components include a butadiene rubber, a butadiene-acrylic composite rubber, an acrylic rubber, an acrylic-silicone composite rubber, an isobutylene-silicone composite rubber, an isoprene rubber, a styrene-butadiene rubber, a chloroprene rubber, an ethylene-propylene rubber, a nitrile rubber, an ethylene-acrylic rubber, a silicone rubber, an epichlorohydrin rubber, a fluororubber, and those obtained by hydrogenating unsaturated bonds of such rubbers. Considering the concern about the generation of harmful substances at the time of combustion, rubber components containing no halogen atom are preferable in terms of environmental impact.

The glass transition temperature of the rubber component is preferably −10° C. or less, and more preferably −30° C. or less. As the rubber component, a butadiene rubber, a butadiene-acrylic composite rubber, an acrylic rubber, and an acrylic-silicone composite rubber are particularly preferable. A composite rubber is a rubber made of two kinds of rubber components copolymerized or inseparably entangled with each other and polymerized to form an IPN structure.

Examples of aromatic vinyls in vinyl compounds to be copolymerized with a rubber component include styrene, α-methylstyrene, p-methylstyrene, alkoxy styrenes, and halogenated styrenes, and styrene is particularly preferable. In addition, examples of acrylic acid esters include methyl acrylate, ethyl acrylate, butyl acrylate, cyclohexyl acrylate, and octyl acrylate, while examples of methacrylic acid esters include methyl methacrylate, ethyl methacrylate, butyl methacrylate, cyclohexyl methacrylate, and octyl methacrylate, and methyl methacrylate is particularly preferable. Among them, it is particularly preferable that a methacrylic acid ester, such as methyl methacrylate, is contained as an essential component. More specifically, a methacrylic acid ester is contained in an amount of preferably 10 wt % or more, more preferably 15 wt % or more, based on 100 wt % of the graft component (in the case of a core-shell type polymer, based on 100 wt % of the shell).

The elastomeric polymer containing a rubber component having a glass transition temperature of 10° C. or less may be produced by any polymerization method such as bulk polymerization, solution polymerization, suspension polymerization, or emulsion polymerization, and the copolymerization technique may be one-stage grafting or several-stage grafting. In addition, it may also be a mixture with a copolymer composed only of the graft component by-produced at the time of production. Further, as polymerization methods, aside from the general emulsion polymerization method, a soap-free polymerization method using an initiator such as potassium peroxodisulfate, a seed polymerization method, a two-stage swelling polymerization method, and the like can also be mentioned. In addition, in a suspension polymerization method, it is also possible to employ a method in which an aqueous phase and a monomer phase are separately maintained and precisely fed to a continuous dispersing machine, and the particle size is controlled by the rotation speed of the dispersing machine, a method in which, in a continuous production method, a monomer phase is fed into an aqueous liquid having dispersive power through a small-diameter orifice having a diameter of several to several tens of micrometers or a porous filter, thereby controlling the particle size, etc. In the case of a core-shell type graft polymer, both for the core and shell, the reaction may be completed in one stage or several stages.

Such elastomeric polymers are commercially available and easily obtainable. For example, examples of elastomeric polymers containing a butadiene rubber, an acrylic rubber, or a butadiene-acrylic composite rubber as a main rubber component include Kaneace B series (e.g., B-56 etc.) of Kanegafuchi Chemical Industry Co., Ltd., Metablen C series (e.g., C-223A, etc.) and W series (e.g., W-450A, etc.) of Mitsubishi Rayon Co., Ltd., Paraloid EXL series (e.g., EXL-2602, etc.), HIA series (e.g., HIA-15, etc.), BTA series (e.g., BTA-III, etc.), and KCA series of Kureha Chemical Industry Co., Ltd., Paraloid EXL series and KM series (e.g., KM-336P, KM-357P, etc.) of Rohm and Haas Company, and UCL Modifier Resin series (UMG-AXS Resin series of UMG ABS, Ltd.) of Ube Cycon Co., Ltd. Examples of elastomeric polymers containing an acrylic-silicone composite rubber as a main rubber component include those commercially available from Mitsubishi Rayon Co., Ltd., under trade names Metablen S-2001 and SRK-200.

It is preferable that the compositional proportion of the impact modifier is 0.2 to 50 parts by weight, preferably 1 to 30 parts by weight, and more preferably 1.5 to 20 parts by weight, per 100 parts by weight of the polycarbonate resin. Within this range, the composition can be provided with excellent impact resistance, while suppressing a decrease in rigidity.

<Multilayer Body>

The multilayer body of the invention can be widely used as a formed article such as a film, a sheet, or a plate. As a forming method for the multilayer body, known methods such as co-extrusion, extrusion lamination, heat lamination, and dry lamination are usable. Among them, it is particularly preferable to use co-extrusion.

In the case of co-extrusion, the resins to form the respective layers of a multilayer body and additives are joined together through a feed block or a multi-manifold die using several extruders, thereby forming a multilayer body. In order to further improve the strength and impact resistance of the multilayer body, it is also possible that the multilayer body obtained in the above step is uniaxially or biaxially stretched by a roll method, a tenter method, a tubular method, or the like.

The total thickness of the multilayer body of the invention is preferably 0.03 to 300 mm, more preferably 0.05 to 100 mm, still more preferably 0.1 to 10 mm, and particularly preferably 0.5 to 3 mm. The proportion of the layer made of a polycarbonate resin (A) in the total thickness of all layers of the multilayer body is preferably 5% or more and 60% or less, more preferably 10% or more and 55% or less, and still more preferably 20% or more and 50% or less. When the thickness of the layer made of a polycarbonate resin (A) is within this range, a multilayer body having excellent surface hardness and heat resistance and further having excellent impact resistance can be provided.

The multilayer body of the invention formed as a film, a sheet, or a plate has excellent transparency, impact resistance, and heat resistance, and also has excellent UV discoloration resistance and surface hardness. Accordingly, although the applications are not limited, the multilayer body of the invention is usable as, for example, a building material, an interior material, a transparent sheet such as a display cover, a sheet for resin-coated metal plates, a sheet for forming (vacuum/pressure forming, hot press forming, etc.), a colored plate, a transparent plate, a shrink film, a shrink label, a shrink tube, an automotive interior material, resin glazing, an electrical appliance member, an OA appliance member, etc.

(Surface Treatment)

The multilayer body of the invention may be subjected to various surface treatments. Surface treatments herein are treatments to form another layer on the surface layer of a resin formed article, such as deposition (physical vapor deposition, chemical vapor deposition, etc.), plating (electroplating, electroless plating, hot dipping, etc.), painting, coating, and printing, and ordinary methods used for polycarbonate resins are applicable. Specific examples of surface treatments include hard coating, water-repellent/oil-repellent coating, UV absorbing coating, IR absorbing coating, metallizing (vapor deposition, etc.), and like various surface treatments. Hard coating is a particularly preferred and required surface treatment.

EXAMPLES

Hereinafter, the invention will be described in detail with reference to examples. However, the invention is not limited thereto. Incidentally, in the Examples, "part" means "part by weight". The used resins and evaluation methods used in the Example are as follows.

1. Polymer Compositional Ratio (NMR)

Each repeating unit was measured using Proton NMR of JNM-AL400 manufactured by JEOL Ltd., to calculate the polymer compositional ratio (molar ratio).

2. Specific Viscosity

Specific viscosity was determined from a solution prepared by dissolving 0.7 g of a polycarbonate resin in 100 ml of methylene chloride at 20° C. using an Ostwald viscometer.

$$\text{Specific Viscosity}(\eta SP) = (t - t_0)/t_0$$

[$t_0$ is the number of seconds taken for methylene chloride to fall, and t is the number of seconds taken for the sample solution to fall]

3. Glass Transition Temperature (Tg)

Glass transition temperature was measured from 8 mg of a polycarbonate resin using Thermoanalysis System DSC-2910 manufactured by TA Instruments in accordance with JIS K7121 in a nitrogen atmosphere (nitrogen flow rate: 40 ml/min) at a temperature rise rate of 20° C./min.

4. Pencil Hardness

In accordance with JIS K5400, in a thermostatic room at ambient temperature of 23° C., on the surface of the first layer of a multilayer body sample cut to a size of 80 mm×60 mm, a line was drawn with a pencil maintained at an angle of 45° under a load of 1 kg, and the surface conditions were visually evaluated.

5. Water Absorption

Water absorption was determined as follows. A cast film having a thickness of 200 μm prepared by dissolving polycarbonate resin pellets in methylene chloride, and then evaporating methylene chloride, was dried at 100° C. for 12 hours and then immersed in water at 25° C. for 48 hours. The resulting weight increase was measured, and water absorption was determined by the following equation.

Water absorption (%)={(resin weight after water absorption−resin weight before water absorption)/resin weight before water absorption}×100

6. Adhesion

On the surface of the first layer of a multilayer body sample, eleven cut lines were made both through the length and width at intervals of 1 mm with a cutter, thereby forming 100 squares. Sellotape® (adhesive tape manufactured by Nichiban Co., Ltd.) was attached thereto and peeled off at once in the 900 direction. The number of squires having the first layer not peeled off and remaining was counted.

7. Impact Resistance

Using a high-velocity impact tester Shimadzu HYDRO-SHOTHITS-P10 (Shimadzu Corporation), a multilayer body sample was tested 10 times under the following conditions: test temperature: 23° C., test speed: 7 m/sec, striker diameter: ½ inch, holder diameter: 1 inch. The maximum impact energy at that time (average) was evaluated.

[Polycarbonate Resin (A)]

PC 1 (Example)

Structural unit derived from isosorbide (hereinafter ISS)/structural unit derived from 3,9-bis(2-hydroxy-1,1-dimethylethyl)-2,4,8,10-tetraoxaspiro(5,5)undecane (hereinafter SPG)=32/68 (mol %), specific viscosity: 0.344

PC 2 (Example)

Structural unit derived from ISS/structural unit derived from SPG=70/30 (mol %), specific viscosity: 0.399

PC 3 (Example)

Structural unit derived from ISS/structural unit derived from SPG/1,9-nonanediol (hereinafter ND)=65/30/5 (mol %), specific viscosity: 0.362

PC 4 (Example)

Structural unit derived from ISS/structural unit derived from SPG/structural unit derived from 1,4-cyclohexanedimethanol (hereinafter CHDM)=50/30/20 (mol %), specific viscosity: 0.341

PC 5 (Comparative Example)

Structural unit derived from ISS/structural unit derived from SPG=80/20 (mol %), specific viscosity: 0.365

PC 6 (Comparative Example)

Structural unit derived from ISS/structural unit derived from SPG=30/70 (mol %), specific viscosity: 0.341

PC 7 (Comparative Example)

Structural unit derived from ISS/structural unit derived from ND=88/12 (mol %), specific viscosity: 0.321

PC 8 (Comparative Example)

Structural unit derived from ISS/structural unit derived from CHDM=50/50 (mol %), specific viscosity: 0.367

PC 9 (Comparative Example)

Structural unit derived from ISS/structural unit derived from CHDM=70/30 (mol %), specific viscosity: 0.361

[Polycarbonate Resin (B)]

PC 10 (Example)

Manufactured by Teijin Chemicals Ltd., trade name: Panlite, viscosity average molecular weight=25,000, reduced viscosity: 0.383

[PMMA]

Acrypet MF, manufactured by Mitsubishi Rayon Co., Ltd.

Example 1

<Production of Polycarbonate Resin A>

164 parts of isosorbide (hereinafter abbreviated to ISS), 724 parts of 3,9-bis(2-hydroxy-1,1-dimethylethyl)-2,4,8,10-tetraoxaspiro(5,5)undecane (hereinafter abbreviated to SPG), and 750 parts of diphenyl carbonate (hereinafter abbreviated to DPC), together with $0.8 \times 10^{-2}$ parts of tetramethylammonium hydroxide and $0.6 \times 10^{-4}$ parts of barium stearate as catalysts, were heated to 200° C. in a nitrogen atmosphere and molten. Subsequently, the temperature was raised to 220° C. and the vacuum degree was adjusted to 20.0 kPa over 30 minutes. Subsequently, the temperature was raised to 240° C. and the vacuum degree was adjusted to 10.0 kPa over further 30 minutes. The mixture was maintained at that temperature for 10 minutes, and then the vacuum degree was adjusted to 133 Pa or less over 1 hour. After the completion of the reaction, the mixture was discharged from the bottom of the reaction tank under a positive pressure of nitrogen and, with cooling in a water tank, cut with a pelletizer to give pellets (PC 1). The obtained pellets were subjected to the various evaluations. The evaluation results are shown in Table 1.

<Production of Polycarbonate Resin Laminate>

The polycarbonate resin (B) (manufactured by Teijin Chemicals Ltd., trade name: Panlite) was molten in a single-screw extruder having a screw diameter of 40 mm, while the polycarbonate resin to form a polycarbonate resin (A) layer prepared by the above production method was molten in a single-screw extruder having a screw diameter of 30 mm, and they were laminated in two layers by a feed block method. The polycarbonate resin (B) was extruded through a T-die set at a temperature of 280° C., while the polycarbonate resin (A) was extruded through a T-die set at a temperature of 230° C., and the obtained sheet was cooled on a mirror-finished roll, thereby giving a laminate including the polycarbonate resin (A) laminated on one side of the polycarbonate resin (B). In addition, the amounts of molten resins discharged were adjusted such that the thickness of each layer at this time was as follows: first layer (polycarbonate resin (A) layer)/second layer (polycarbonate resin layer (B))=0.1/1.0 (mm). The evaluation results of the obtained laminate are shown in Table 1.

Example 2

<Production of Polycarbonate Resin>

The operation was performed in exactly the same manner as in Example 1, except that 358 parts of ISS, 319 parts of SPG, and 750 parts of DPC were used as raw materials, followed by evaluations in the same manner (PC 2). The results are shown in Table 1.

<Production of Polycarbonate Resin Laminate>

The operation was performed in exactly the same manner as in Example 1, except that the polycarbonate resin (A) was extruded through a T-die set at a temperature of 250° C., followed by evaluations in the same manner. The results are shown in Table 1.

Example 3

The operation was performed in exactly the same manner as in Example 1, except that 332 parts of ISS, 319 parts of SPG, 28 parts of ND, and 750 parts of DPC were used as raw materials, followed by evaluations in the same manner (PC 3) The results are shown in Table 1.

<Production of Polycarbonate Resin Laminate>

The operation was performed in exactly the same manner as in Example 1, except that the polycarbonate resin (A) was extruded through a T-die set at a temperature of 240° C., followed by evaluations in the same manner. The results are shown in Table 1.

Example 4

The operation was performed in exactly the same manner as in Example 1, except that 256 parts of ISS, 319 parts of SPG, 101 parts of CHDM, and 750 parts of DPC were used as raw materials, followed by evaluations in the same manner (PC 4) The results are shown in Table 1.

<Production of Polycarbonate Resin Laminate>

The operation was performed in exactly the same manner as in Example 1, followed by evaluations in the same manner. The results are shown in Table 1.

Comparative Example 1

<Production of Polycarbonate Resin>

The operation was performed in exactly the same manner as in Example 1, except that 409 parts of ISS, 213 parts of SPG, and 750 parts of DPC were used as raw materials, followed by evaluations in the same manner (PC 5). The results are shown in Table 1.

<Production of Polycarbonate Resin Laminate>

The operation was performed in exactly the same manner as in Example 1, except that the polycarbonate resin (A) was extruded through a T-die set at a temperature of 250° C., followed by evaluations in the same manner. Although the melt viscosity was high, and the forming workability deteriorated, a laminate was obtained. The obtained laminate had low adhesion between the resins, and thus was not capable of achieving the original purpose.

Comparative Example 2

<Production of Polycarbonate Resin>

The operation was performed in exactly the same manner as in Example 1, except that 153 parts of ISS, 745 parts of SPG, and 750 parts of DPC were used as raw materials, followed by evaluations in the same manner (PC 6). The results are shown in Table 1.

<Production of Polycarbonate Resin Laminate>

The operation was performed in exactly the same manner as in Example 1, followed by evaluations in the same manner. The obtained laminate was insufficient in terms of heat resistance, and thus was not capable of achieving the original purpose.

Comparative Example 3

<Production of Polycarbonate Resin>

The operation was performed in exactly the same manner as in Example 1, except that 450 parts of ISS, 67 parts of ND, and 750 parts of DPC were used as raw materials, followed by evaluations in the same manner (PC 7). The results are shown in Table 1.

<Production of Polycarbonate Resin Laminate>

The operation was performed in exactly the same manner as in Example 1, except that the polycarbonate resin (A) was extruded through a T-die set at a temperature of 240° C., followed by evaluations in the same manner. The obtained laminate had low adhesion between the resins, and thus was not capable of achieving the original purpose.

Comparative Example 4

<Production of Polycarbonate Resin>

The operation was performed in exactly the same manner as in Example 1, except that 256 parts of ISS, 252 parts of CHDM, and 750 parts of DPC were used as raw materials, followed by evaluations in the same manner (PC 8). The results are shown in Table 1.

<Production of Polycarbonate Resin Laminate>

The operation was performed in exactly the same manner as in Example 1, followed by evaluations in the same manner. The obtained laminate was insufficient in terms of heat resistance and also inferior in terms of surface hardness, and thus was not capable of achieving the original purpose.

Comparative Example 5

<Production of Polycarbonate Resin>

The operation was performed in exactly the same manner as in Example 1, except that 358 parts of ISS, 151 parts of CHDM, and 750 parts of DPC were used as raw materials, followed by evaluations in the same manner (PC 9). The results are shown in Table 1.

<Production of Polycarbonate Resin Laminate>

The operation was performed in exactly the same manner as in Example 1, followed by evaluations in the same manner. The obtained laminate had low adhesion between the resins, and thus was not capable of achieving the original purpose.

Comparative Example 6

<Production of Laminate>

The operation was performed in exactly the same manner as in Example 1, except that PMMA (Acrypet MF, manufactured by Mitsubishi Rayon Co., Ltd.) was used in place of the polycarbonate resin (A), followed by evaluations in the same manner. The obtained laminate was below the satisfactory level in terms of heat resistance and water absorbency. In addition, also in terms of impact resistance, the laminate was not capable of achieving the original purpose.

TABLE 1

|  |  | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Later Structure | First Layer Resin (A) | PC1 | PC2 | PC3 | PC4 | PC5 | PC6 | PC7 | PC8 | PC9 | PMMA |
|  | Second Layer Resin (B) | PC10 | PC10 | PC10 | PC10 | PC10 | PC10 | PC10 | PC10 | PC10 | PC10 |
| First Layer Composition | mol % | ISS/SPG = 32/68 | ISS/SPG = 70/30 | ISS/SPG/ND = 65/30/5 | ISS/SPG/CHDM = 50/30/20 | ISS/SPG = 80/20 | ISS/SPG = 30/70 | ISS/ND = 88/12 | ISS/CHDM = 50/50 | ISS/CHDM = 70/30 | — |
| Tg (First Layer) | ° C. | 111 | 145 | 120 | 112 | 147 | 108 | 120 | 100 | 120 | 108 |
| Surface Hardness (First Layer) | — | H | H | H | F | H | F | H | HB | F | 2H |
| Water Absorption (First Layer) | % | 0.8 | 1.4 | 1.2 | 1.0 | 1.6 | 0.8 | 1.8 | 1.4 | 2.2 | 2.2 |
| Adhesion | — | 100/100 | 90/100 | 90/100 | 85/100 | 0/100 | 100/100 | 0/100 | 100/100 | 0/100 | 100/100 |
| Impact Resistance | J | 14 | 18 | 21 | 21 | 19 | 12 | 42 | 40 | 35 | 7 |

INDUSTRIAL APPLICABILITY

The multilayer body of the invention is useful as a building material, an interior material, a transparent sheet such as a display cover, a sheet for resin-coated metal plates, a sheet for forming (vacuum/pressure forming, hot press forming, etc.), a colored plate, a transparent plate, a shrink film, a shrink label, a shrink tube, an automotive interior material, resin glazing, an electrical appliance member, or an OA appliance member.

The invention claimed is:

1. A multilayer body comprising:
   at least one layer made of a polycarbonate resin (A) whose main repeating units include a unit (a-1) represented by the following formula:

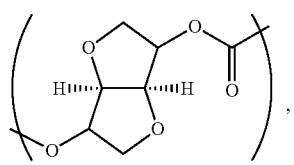

(a-1)

and a unit (a-2) represented by the following formula:

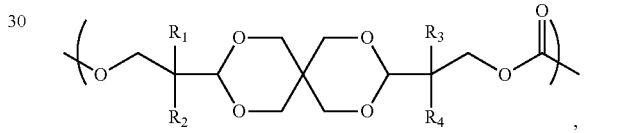

(a-2)

wherein $R_1$, $R_2$, $R_3$, and $R_4$ are each a hydrogen atom or a $C_{1-5}$ alkyl group, the unit (a-1) and the unit (a-2) being in a molar ratio (a-1/a-2) of 32/68 to 70/30; and
   at least one layer made of an aromatic polycarbonate resin (B),
   wherein the total of the main repeating units (a-1) and (a-2), based on the entire repeating units, is 70 mol % or more.

2. The multilayer body according to claim 1, wherein the aromatic polycarbonate resin (B) is a polycarbonate resin made from bisphenol A.

3. The multilayer body according to claim 1, wherein the polycarbonate resin (A) has a glass transition temperature of 110° C. to 145° C.

4. The multilayer body according to claim 1, wherein the polycarbonate resin (A) has a saturated water absorption of 2.0% or less.

5. The multilayer body according to claim 1, wherein the layer made of a polycarbonate resin (A) has a surface hardness of F or higher.

* * * * *